(12) United States Patent
Stanton et al.

(10) Patent No.: US 12,715,246 B1
(45) Date of Patent: Aug. 25, 2026

(54) RIGID SUPPORT BARS FOR BANJO-STYLE ELECTRIC AXLE STAMPED DIFFERENTIAL COVER

(71) Applicant: Schaeffler Technologies AG & Co. KG, Herzogenaurach (DE)

(72) Inventors: Tyler Stanton, Cuyahoga Falls, OH (US); Brian Taggart, Lakeville, OH (US); David Burky, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/172,248

(22) Filed: Apr. 7, 2025

(51) Int. Cl.
*B60B 35/16* (2006.01)
*B60K 1/00* (2006.01)
*B60K 17/16* (2006.01)
*F16H 57/02* (2012.01)
*F16H 57/031* (2012.01)
*F16H 57/037* (2012.01)

(52) U.S. Cl.
CPC ........... *B60B 35/16* (2013.01); *B60K 17/165* (2013.01); *F16H 57/031* (2013.01); *F16H 57/037* (2013.01); *B60K 2001/001* (2013.01); *F16H 2057/02034* (2013.01); *F16H 2057/02052* (2013.01)

(58) Field of Classification Search
CPC .... F16H 57/031; F16H 57/032; F16H 57/037; F16H 2057/02034; F16H 2057/02052; F16H 2057/02091; B60B 35/16; B60B 35/163; B60K 2001/001; B60K 17/165
See application file for complete search history.

(56) References Cited

U.S. PATENT DOCUMENTS 2,578,155 A * 12/1951 Slider .................. F16H 57/037 475/230
2,906,360 A * 9/1959 Daley, Jr. ............. F16H 57/028 74/424
4,625,581 A * 12/1986 Hull ..................... F16H 57/032 74/606 R (Continued)

FOREIGN PATENT DOCUMENTS

CN 111745355 A * 10/2020 ............ B23K 10/00
DE 1264974 B * 3/1968

(Continued)

OTHER PUBLICATIONS

Machine translation of JP 2023-92702 A obtained on Jan. 7, 2026.*

*Primary Examiner* — Adam D Rogers
(74) *Attorney, Agent, or Firm* — Suiter Swantz IP

(57) ABSTRACT

A differential cover may be supported by a support plate to form a cover assembly. The differential cover and the support plate may be welded together. The support plate may overlap with and strengthen a flange portion of the differential cover. The support plate may be a one-piece support plate which is a support plate ring or a two-piece support plate which is segmented into support plate halves. The flange portion of the differential cover may be affixed to a banjo axle case. The banjo axle case may be used in an electric beam axle to house a differential. The increase in strength provided to the flange portion by the support plate may enable decreasing the thickness of the differential cover and reducing the weight of the electric beam axle.

20 Claims, 11 Drawing Sheets

(56) References Cited

U.S. PATENT DOCUMENTS 4,756,466 A * 7/1988 Peck .................... B23K 31/02 228/173.6
5,133,696 A * 7/1992 Kobayashi ............. F16H 48/30 192/106 F
5,163,226 A * 11/1992 Phelps .................... B60B 35/16 29/897.2
5,271,294 A * 12/1993 Osenbaugh ............ B60K 17/16 74/606 R
5,297,855 A * 3/1994 Jeng ........................ B60B 35/16 301/124.1
7,004,879 B2 * 2/2006 Beutler ................. F16H 57/031 475/230
7,241,246 B2 * 7/2007 Beutler ................. F16H 57/029 475/230
8,657,716 B1 * 2/2014 Whyte .................. F16H 57/032 475/220
9,944,229 B2 * 4/2018 Kelly .................. F16H 57/0402
10,279,625 B2 * 5/2019 Kelly .................... F16H 57/032
11,225,107 B1 * 1/2022 Peck ....................... B60B 35/14
11,535,057 B2 * 12/2022 Peck ....................... B60B 35/14
11,840,115 B2 * 12/2023 Ogawa ................... B21D 53/90
2003/0015014 A1 * 1/2003 Zmyslowski ............ B21K 1/56 72/335
2007/0049452 A1 * 3/2007 Carter ..................... F16H 48/08 475/220
2008/0227581 A1 * 9/2008 Catalano ................ B60B 35/16 74/606 R
2011/0082001 A1 4/2011 Beutler et al.
2016/0312876 A1 10/2016 Demitroff et al.
2018/0297401 A1 10/2018 Liu et al.
2019/0315216 A1 10/2019 Ziech et al.
2024/0109410 A1 * 4/2024 Laforce .................. B60K 17/04
2024/0255049 A1 8/2024 Angel et al.
2024/0288061 A1 8/2024 Rentfrow
2025/0010697 A1 1/2025 Wood et al.

FOREIGN PATENT DOCUMENTS

JP 2023092702 A * 7/2023
KR 20160141397 A * 12/2016 ............. B60K 17/22
KR 101754116 B1 * 7/2017 ............. B60K 17/22

* cited by examiner

100

100
112
114
106
104b
113
108
102
114
116
104b
106
110
112

300
308
312
316
112
100
310
104a
116
313
318
319
304
306
302
314
310
312
308

414
406
410
408
416
402
412
116
104a
300
100
408
404
406
400

RIGID SUPPORT BARS FOR BANJO-STYLE ELECTRIC AXLE STAMPED DIFFERENTIAL COVER

TECHNICAL FIELD

The present disclosure generally relates to gearboxes for accommodating differential gearings, and more particularly, to covers for the gearboxes.

BACKGROUND

Electric beam axles are used in hybrid and electric motor vehicles to transfer rotational energy from the electric motor to the wheels of the vehicle, causing the vehicle to propel in a specified direction. Electric beam axles include the electric motor and the gearing/gearbox required to transfer the rotational energy from the electric motor to the wheels of the vehicle. The electric beam axles may include a banjo axle case. A differential cover may cover a differential in the banjo axle case. The weight of the differential cover, together with the weight of the banjo axle case, may contribute to the un-sprung weight of the vehicle. Reducing the un-sprung weight of the vehicle is beneficial to improve traction and handling. Therefor it is desirable to reduce the weight of the differential cover. During development of the electric beam axle with the banjo axle case, difficulties with the durability of the banjo axle case were shown while under maximum loading conditions. The durability issue were accentuated as the thickness of the differential cover was reduced. Therefore, it would be advantageous to provide a device, system, and method that cures the shortcomings described above.

SUMMARY

A cover assembly is described, in accordance with one or more embodiments of the present disclosure. The cover assembly may include: a differential cover, wherein the differential cover includes a body portion and a flange portion, wherein the body portion bulges outward from the flange portion, wherein the flange portion is disposed around and extends from the body portion; a support plate, wherein the support plate and the flange portion are flat members, wherein the support plate and the flange portion overlap, wherein the support plate and the body portion do not overlap; and a plate-to-cover weld joint, wherein the differential cover and the support plate are welded together by the plate-to-cover weld joint.

In some aspects, the support plate is thicker than the differential cover.

In some aspects, the support plate is at least two times thicker than the differential cover.

In some aspects, the differential cover and the support plate are stamped metal.

In some aspects, the differential cover and the support plate are steel or an alloy thereof.

In some aspects, the plate-to-cover weld joint is formed along an entirety of an edge of the support plate.

In some aspects, the plate-to-cover weld joint includes an edge joint between an edge of the flange portion and the edge of the support plate.

In some aspects, the differential cover includes a pair of triangular portions, wherein the pair of the triangular portions extend from opposing sides of the flange portion, wherein the plate-to-cover weld joint includes a lap joint between the edge of the support plate and a face defined between the flange portion and the pair of the triangular portions.

In some aspects, the body portion includes a non-tapered section and a pair of tapered sections, wherein the non-tapered section is disposed between the pair of tapered sections, wherein the pair of tapered sections taper outward from the flange portion to the non-tapered section.

In some aspects, the flange portion extends from the non-tapered section and the pair of tapered sections, wherein the support plate conforms to at least the pair of tapered sections, wherein the plate-to-cover weld joint includes a lap joint between the edge of the support plate and a face defined between the flange portion and the pair of tapered section.

In some aspects, the support plate and the flange portion define a plurality of through holes, wherein the plurality of through holes defined by the support plate and the plurality of through holes defined by the flange portion are aligned.

In some aspects, the support plate is segmented into support plate halves, wherein the support plate halves partially conform around the body portion.

In some aspects, the support plate halves include a C-shape.

In some aspects, the support plate is a support plate ring, wherein the support plate ring fully conforms around the body portion.

A banjo axle case is described, in accordance with one or more embodiments of the present disclosure. The banjo axle case may include: an upper half member; a lower half member, wherein the upper half member and the lower half member define a first tube portion, a second tube portion, and a central portion, wherein the central portion is disposed between the first tube portion and the second tube portion; an upper-to-lower weld joint, wherein the upper half member and the lower half member abut together and are welded together by the upper-to-lower weld joint; a cover assembly including: a differential cover, wherein the differential cover includes a body portion and a flange portion, wherein the body portion bulges outward from the flange portion, wherein the flange portion is disposed around and extends from the body portion; a support plate, wherein the support plate and the flange portion are flat members, wherein the support plate and the flange portion overlap, wherein the support plate and the body portion do not overlap; and a plate-to-cover weld joint, wherein the differential cover and the support plate are welded together by the plate-to-cover weld joint; and a cover-to-center weld joint, wherein the differential cover and the central portion are welded together by the cover-to-center weld joint.

In some aspects, the central portion includes a flange section, wherein the flange portion of the differential cover and the flange section of the central portion overlap, wherein the cover-to-center weld joint includes a lap joint between an edge of the flange portion and a face of the flange section.

In some aspects, the support plate, the flange portion, and the flange section define a plurality of through holes, wherein the plurality of through holes defined by the support plate, the plurality of through holes defined by the flange portion, and the plurality of through holes defined by the flange section are aligned.

In some aspects, the differential cover includes a pair of triangular portions, wherein the pair of the triangular portions extend from opposing sides of the flange portion, wherein the pair of triangular portions abut edges of the upper half member and the lower half member, wherein the cover-to-center weld joint includes a butt joint between edges of the pair of triangular portions and edges of the upper half member and the lower half member.

An electric beam axle is described, in accordance with one or more embodiments of the present disclosure. The electric beam axle may include: a banjo axle casing including: an upper half member; a lower half member, wherein the upper half member and the lower half member define a first tube portion, a second tube portion, and a central portion, wherein the central portion is disposed between the first tube portion and the second tube portion; an upper-to-lower weld joint, wherein the upper half member and the lower half member abut together and are welded together by the upper-to-lower weld joint; a cover assembly including: a differential cover, wherein the differential cover includes a body portion and a flange portion, wherein the body portion bulges outward from the flange portion, wherein the flange portion is disposed around and extends from the body portion; a support plate, wherein the support plate and the flange portion are flat members, wherein the support plate and the flange portion overlap, wherein the support plate and the body portion do not overlap; and a plate-to-cover weld joint, wherein the differential cover and the support plate are welded together by the plate-to-cover weld joint; and a cover-to-center weld joint, wherein the differential cover and the central portion are welded together by the cover-to-center weld joint; and an electric drive unit including a differential, an electric motor, and a transmission, wherein the differential is disposed within the central portion, wherein the banjo axle casing and the differential are fastened together by a plurality of fasteners.

In some aspects, the central portion includes a flange section, wherein the flange portion of the differential cover and the flange section of the central portion overlap, wherein the cover-to-center weld joint includes a lap joint between an edge of the flange portion and a face of the flange section, wherein the support plate, the flange portion, and the flange section define a plurality of through holes, wherein the plurality of through holes defined by the support plate, the plurality of through holes defined by the flange portion, and the plurality of through holes defined by the flange section are aligned, wherein the plurality of fasteners fasten between the plurality of through holes and the differential.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the description and drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
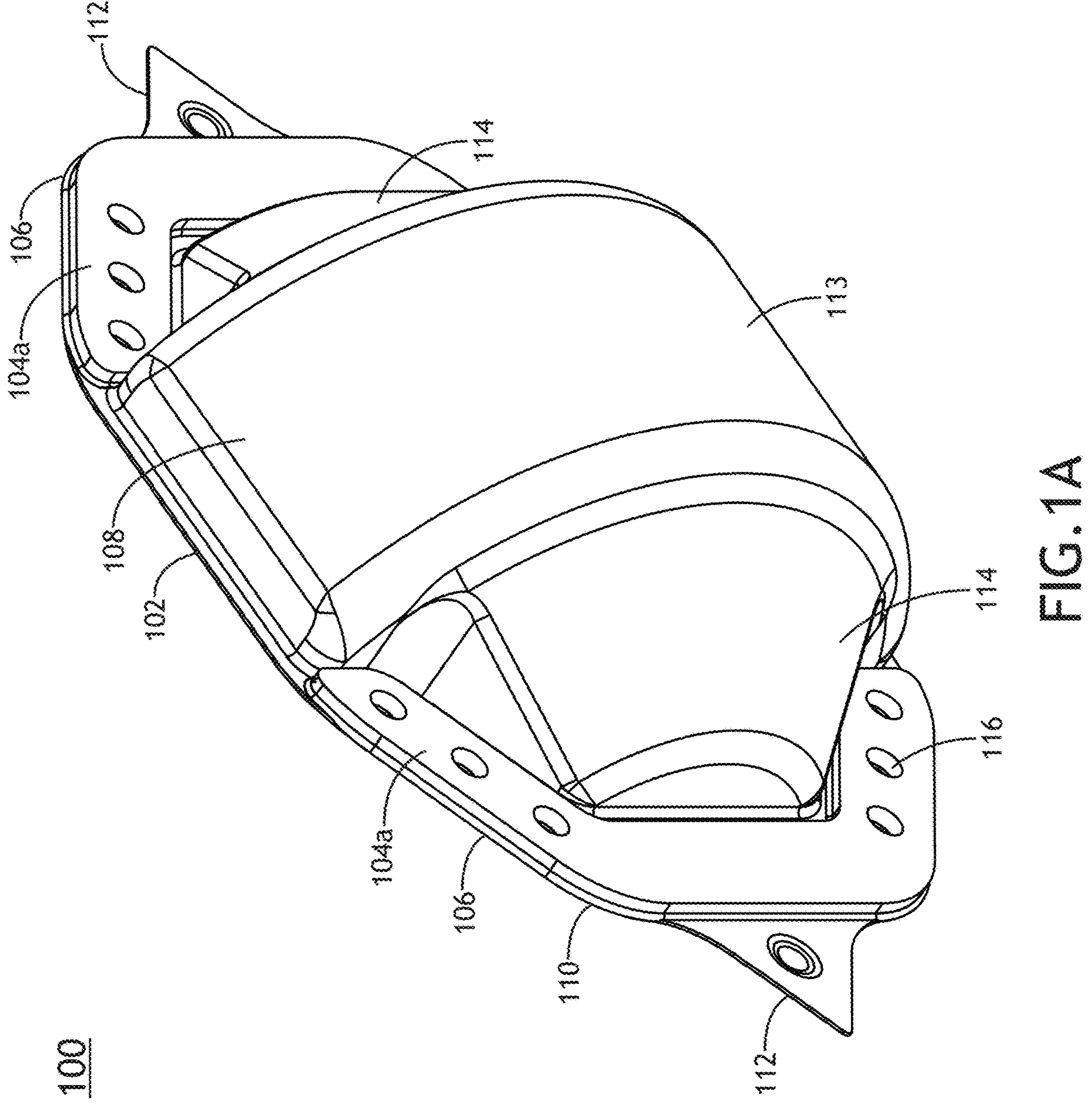
FIG. 1A illustrates a rear perspective view of a cover assembly with a support plate which is segmented into support plate halves, in accordance with one or more embodiments of the present disclosure.
Figure 1B:
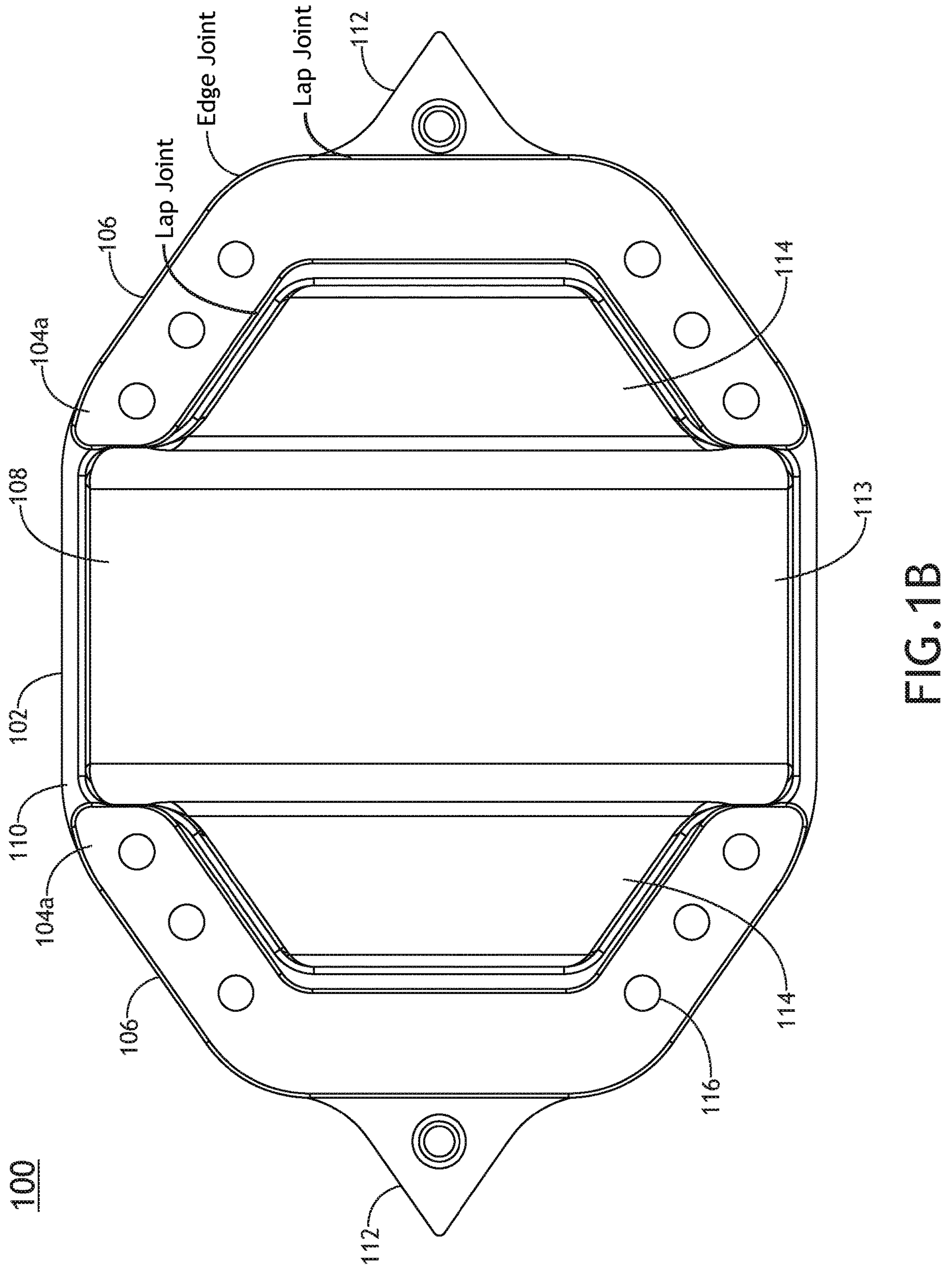
FIG. 1B illustrates a rear view of the cover assembly, in accordance with one or more embodiments of the present disclosure.
Figure 1C:
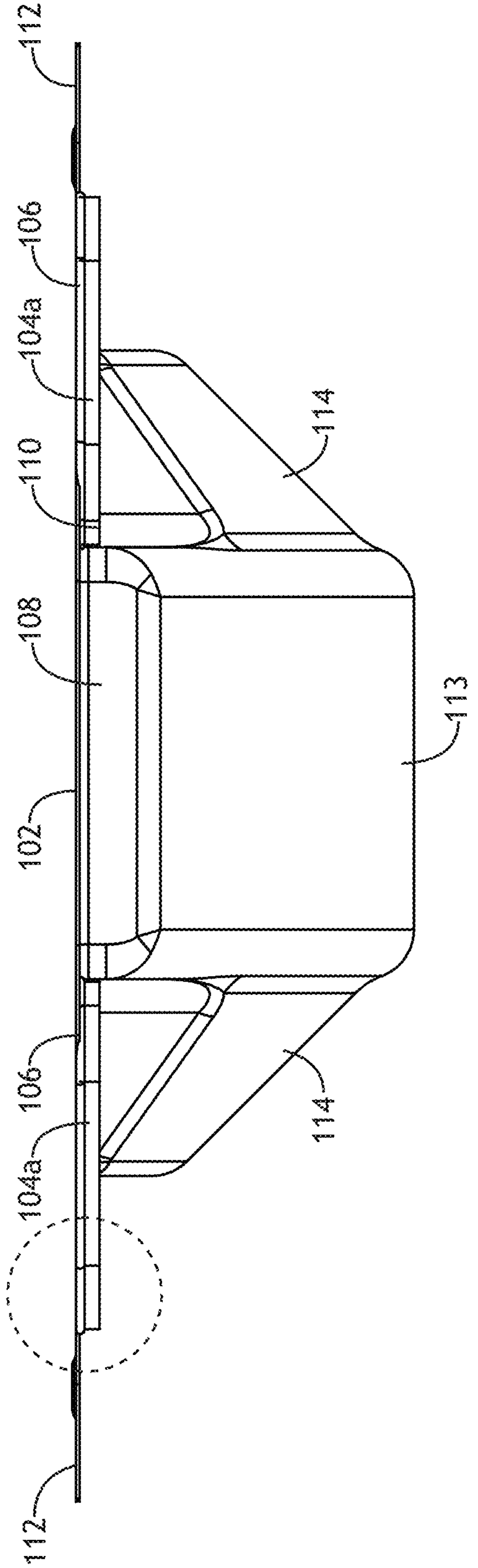
FIG. 1C illustrates a top view of the cover assembly, in accordance with one or more embodiments of the present disclosure.
Figure 1D:
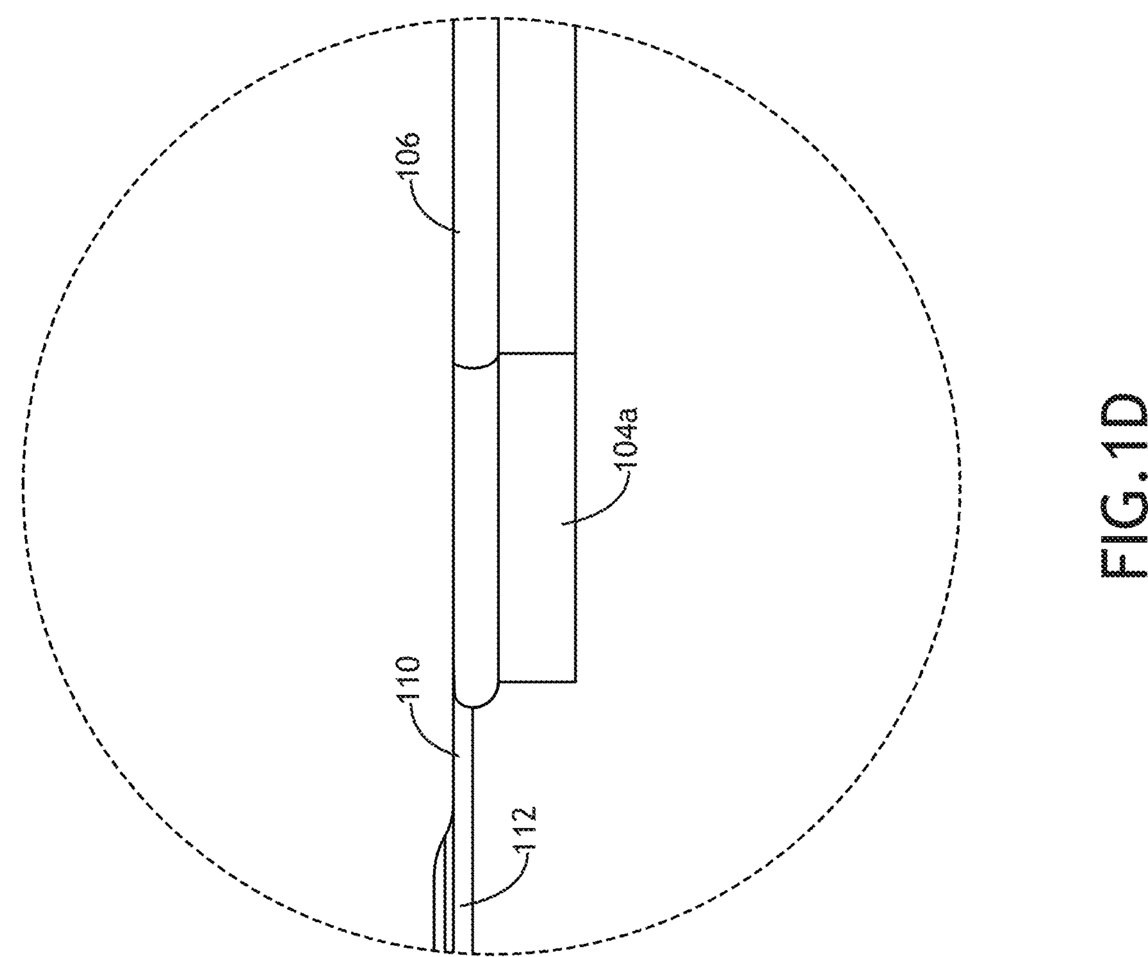
FIG. 1D illustrates a partial top view taken from FIG. 1C, in accordance with one or more embodiments of the present disclosure.
Figure 1E:
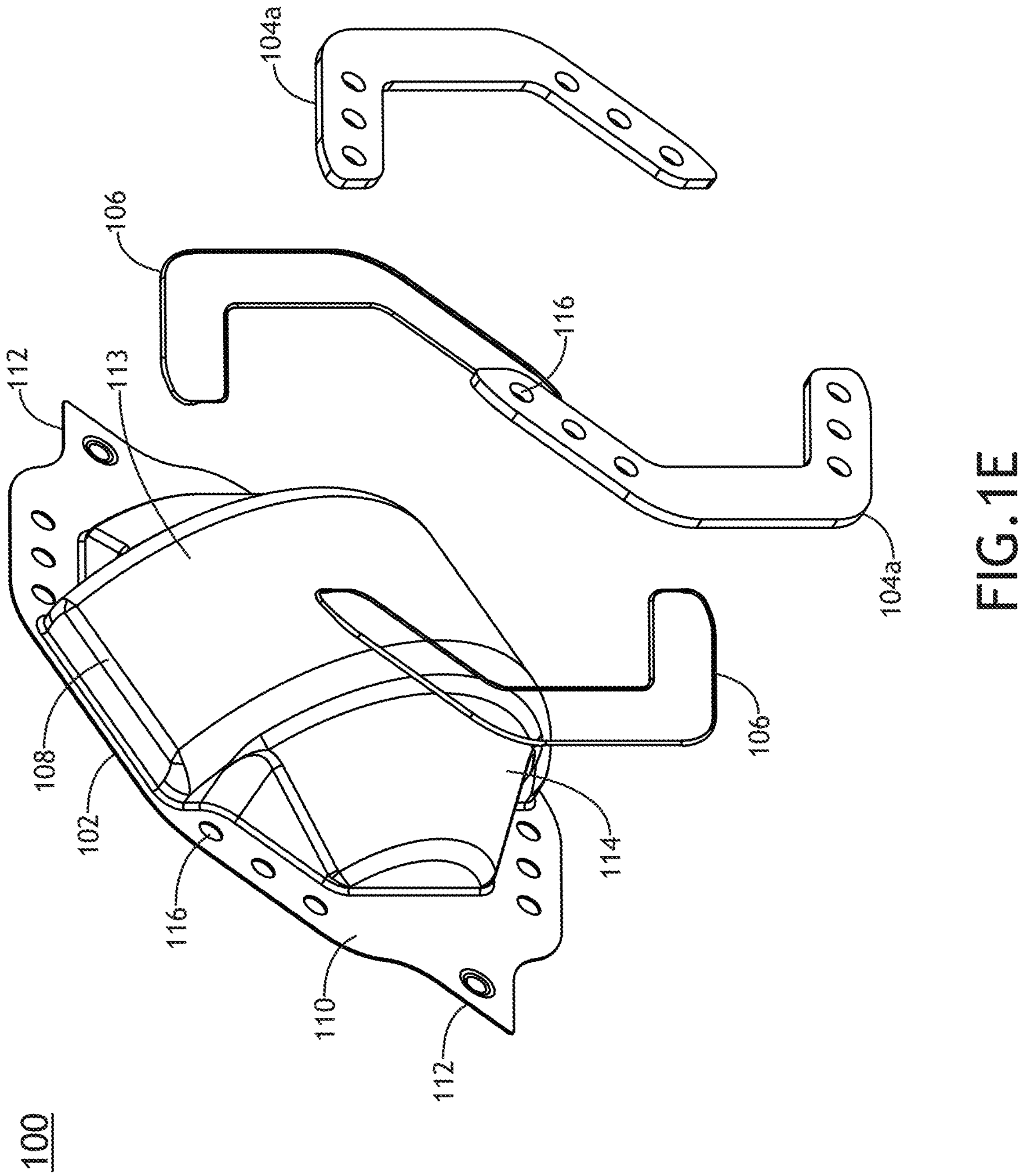
FIG. 1E illustrates an exploded view of the cover assembly, in accordance with one or more embodiments of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to rigid support bars for banjo-style electric axle stamped differential cover. A differential cover may be supported by a support plate to form a cover assembly. The differential cover and the support plate may be welded together. The support plate may overlap with and strengthen a flange portion of the differential cover. The support plate may be a one-piece support plate which is a support plate ring or a two-piece support plate which is segmented into support plate halves. The flange portion of the differential cover may be welded to a banjo axle case. The banjo axle case may be used in an electric beam axle to house a differential. The increase in strength provided to the flange portion by the support plate may enable decreasing the thickness of the differential cover and reducing the weight of the electric beam axle.

FIGS. 1A-2B illustrate a cover assembly 100, in accordance with one or more embodiments of the present disclosure. The cover assembly 100 may include a differential cover 102, support plate 104, and a plate-to-cover weld joint 106.

The differential cover 102 may be a one-piece differential cover. For example, the differential cover 102 may be monolithic. In this regard, the differential cover 102 may a single piece which is not formed of halves or other constituent pieces. The differential cover 102 may also be referred to as a shell, a casing, or the like. The differential cover 102 may be a cover for a differential (e.g., differential 410). The differential cover 102 may include a body portion 108, a flange portion 110, and/or triangular portions 112. The body portion 108 may bulge outward from the flange portion 110. The flange portion 110 may disposed around and extend from the body portion 108. The differential cover 102 may include a pair of the triangular portions 112. The triangular portions 112 may extend from opposing sides of the flange portion 110.

The support plate 104 may also be referred to as a support bar, a backstrap, or the like.

The support plate 104, the flange portion 110, and/or the triangular portions 112 may be flat members. For example, the support plate 104, the flange portion 110, and/or the triangular portions 112 may be flat along a vertical plane. The support plate 104, the flange portion 110, and/or the triangular portions 112 may not include any significant curvature along the vertical plane. The flange portion 110 and the triangular portions 112 may be coplanar. The support plate 104 may be in an offset plane from the flange portion 110.

The support plate 104 may overlap with one or more portions of the differential cover 102. The support plate 104 and the flange portion 110 may overlap. For example, faces of the support plate 104 and the flange portion 110 may overlap. The support plate 104 and the body portion 108 may not overlap. For example, the support plate 104 may not overlap with the non-tapered section 113 and/or tapered sections 114 of the body portion 108. The support plate 104 may reinforce the flange portion 110 without adding more material to the body portion 108. The thickness of the cover assembly 100 along the flange portion 110 may be increased using the support plate 104 without increasing the thickness of the cover assembly 100 along the body portion 108. The support may be added to the cover assembly 100 where needed without increasing the thickness everywhere over the cover assembly 100.

The differential cover 102 and the support plate 104 may be welded together. The differential cover 102 and the support plate 104 may be welded together by the plate-to-cover weld joint 106. The plate-to-cover weld joint 106 may be formed between the differential cover 102 and the support plate 104 along an edge of the support plate 104. For example, the plate-to-cover weld joint 106 may be along a portion of and/or the entirety of the edge of the support plate 104. The plate-to-cover weld joint 106 may seal together the differential cover 102 and the support plate 104 by being formed along the entirety of the edge of the support plate 104. Sealing together the differential cover 102 and the support plate 104 may prevent fluid form ingress or egressing between the perimeter of the support plate 104 and the through holes 116.

The support plate 104 may increase the strength and rigidity of the differential cover 102. The support plate 104 may be considered a "support" by reinforcing the strength and rigidity of the flange portion 110, or otherwise supporting the flange portion 110. The support plate 104 may enable the differential cover 102 to maintain structural integrity under various load and bending stresses. The support plate 104 may enhance the structural integrity of the cover assembly 100 under conditions of maximum loading and bending. The overlap and the plate-to-cover weld joint 106 between the differential cover 102 and the support plate 104 may provide extra rigidity for the cover assembly 100 (e.g., as determined by bending analysis).

The cover assembly 100 may include a select thickness. The thickness of the cover assembly 100 may be defined by the differential cover 102 and/or the support plate 104. The thickness of the cover assembly 100 may be non-uniform along the cover assembly 100. For example, the portion of the cover assembly 100 defined by the support plate 104 and the flange portion 110 may be thicker than the portion of the cover assembly 100 defined by the body portion 108. The portion of the cover assembly 100 defined by the support plate 104 and the flange portion 110 may be thicker than the portion of the cover assembly 100 defined by the body portion 108 because the sum of the thicknesses of the support plate 104 and the flange portion 110 is thicker than the thickness of the body portion 108.

The thicknesses of the differential cover 102 and the support plate 104 may be uniform along the differential cover 102 and the support plate 104, respectively. The addition of the support plate 104 may enable reducing the thickness of the differential cover 102, while maintaining a select level of strength and rigidity for the cover assembly 100. For example, existing differential covers may include a thickness on between 5 mm and 6 mm. The thickness of the differential cover 102 may be on the order of 1 mm and 2 mm (e.g., about 1.5 mm). The support plate 104 may be thicker than the differential cover 102. The support plate 104 may be at least two times thicker than the differential cover 102. For example, the support plate 104 may be at least five times thicker than the differential cover 102. In this instance, the support plate may include a thickness of about 8 mm. The support plate 104 being thicker than the differential cover 102 may improve the strength of the cover assembly 100 while reducing the thickness of the body portion 108. By utilizing thicker material for the support plate 104, thinner material may be employed for the differential cover 102 because the role of the differential cover 102 in supporting the cover assembly 100 is diminished. The strategic material allocation contributes to reduced manufacturing and material costs for the cover assembly 100.

The differential cover 102 and/or the support plate 104 may be formed by any suitable manufacturing process. For example, the differential cover 102 and/or the support plate 104 may be stamped, deep drawn, or the like. For instance, the differential cover 102 and/or the support plate 104 may each be formed from a sheet metal blank via a stamping process. Thus, the differential cover 102 and/or the support plate 104 may be stamped metal. The support plate 104 may provide structural integrity to the cover assembly 100 while keeping the differential cover 102 and the support plate 104 both stamped, and economical.

The differential cover 102 and/or the support plate 104 may include any suitable metal, such as, but not limited to, steel or an alloy thereof (e.g., the sheet metal blank may be steel or an alloy thereof). The support plate 104 may be fabricated from a steel alloy congruent with that used in the construction of the differential cover 102, ensuring material compatibility and uniform performance characteristics across the cover assembly 100. The plate-to-cover weld joint 106 may include any suitable material, such as, but not limited to, an alloy of the differential cover 102, the support plate 104, and/or a filler metal.

The body portion 108 may be three-dimensionally contoured. For example, the body portion 108 may include a non-tapered section 113 and/or tapered sections 114. The non-tapered section 113 may be considered non-tapered in that the non-tapered section 113 may be disposed at a consistent distance from the flange portion 110 along the width of the non-tapered section 113. The non-tapered section 113 may include any suitable shape, such as, but not limited to, a hollow hemicylinder (e.g., a cylinder which is hollow and halved along the axis of the cylinder). The body portion 108 may include a pair of the tapered sections 114. The non-tapered section 113 may be disposed between the tapered sections 114. The tapered sections 114 may taper outwards from the flange portion 110 to the non-tapered section 113. The distance from the flange portion 110 to the tapered sections 114 may increase along the width (e.g., the direction between the triangular portions 112) of the tapered sections 114 up to the non-tapered section 113. The tapered sections 114 may include any suitable shape, such as, but not limited to, a hollow hemi-conical frustum (e.g., a cone which is hollow, halved along the axis of the cone, and truncated perpendicular to the axis of the cone to define two parallel bases of which one has a smaller diameter than the other). It is further contemplated that the non-tapered section 113 and/or the tapered sections 114 may include hollow-polygonal shapes. However, the shapes of the non-tapered section 113 and/or the tapered sections 114 with radii may be beneficial when stamping the differential cover 102.

The flange portion 110 may extend from the non-tapered section 113 and/or the tapered sections 114. For example, the flange portion 110 may extend from the sides, the top, and/or the bottom of the non-tapered section 113 and/or the sides, the top, and/or the bottom of the tapered sections 114.

The support plate 104 may conform to the non-tapered section 113 and/or the tapered sections 114. The support plate 104 may conform to the sides, the top, and/or the bottom of the tapered sections 114 and/or the sides, the top, and/or the bottom of the non-tapered section 113. The support plate 104 may conform to the sides, the top, and the bottom of the tapered sections 114. The support plate 104 may also conform to the sides of the non-tapered section 113. The support plate 104 may or may not conform to the top and/or bottom of the non-tapered section 113. The support plate 104 may also be aligned with the edges of the flange portion 110.

The support plate 104 and the flange portion 110 may define through holes 116. The through holes 116 of the support plate 104 and the through holes 116 of the flange portion 110 may be aligned. The through holes 116 may be disposed at one or more positions on the flange portion 110. For example, the flange portion 110 may define arrays of the through holes 116 above and below the tapered sections 114, with the non-tapered section 113 disposed therebetween. For instance, the flange portion 110 may define four linear arrays with three of the through holes 116, for a total of twelve of the through holes 116, although this is not intended to be limiting. The linear arrays may be swept at an angle relative to vertical.

The plate-to-cover weld joint 106 may include any suitable type of joint, such as, but not limited to, a lap joint and/or an edge joint. The type of the joint may be based on the position of the plate-to-cover weld joint 106 along the differential cover 102. The plate-to-cover weld joint 106 may be along one or more edges and/or faces of the differential cover 102. The edge joint may be between the edge of the differential cover 102 and the edge of the support plate 104. For example, the edge joint may be between a portion of the edge of the flange portion 110 and/or the edge of the support plate 104. The lap joint may be along a face of the differential cover 102 and the edge of the support plate 104. For example, the lap joint may be between the edge of the support plate 104 and a face defined between the flange portion 110 and the triangular portions 112. By way of another example, the lap joint may be between the edge of the support plate 104 and a face defined between the flange portion 110 and the tapered section 114.

The support plate 104 may be a one or more-piece support plate (e.g., a one-piece support plate, a two-piece support plate). For example, the differential cover 102 may be monolithic or may be formed of halves or other constituent pieces.

As illustrated in FIGS. 1A-1E, the support plate 104 may be a two-piece support plate which may be segmented into support plate halves **104*a*. The support plate halves 104*a* may include a shape, such as, but not limited to, a C-shape. The support plate halves 104*a* may conform to the sides, the top, and the bottom of the tapered sections 114, may conform to the sides of the non-tapered section 113, and may not conform to the top and/or bottom of the non-tapered section 113. In this regard, the support plate halves 104*a* may partially conform around the body portion 108**.

Figure 2A:
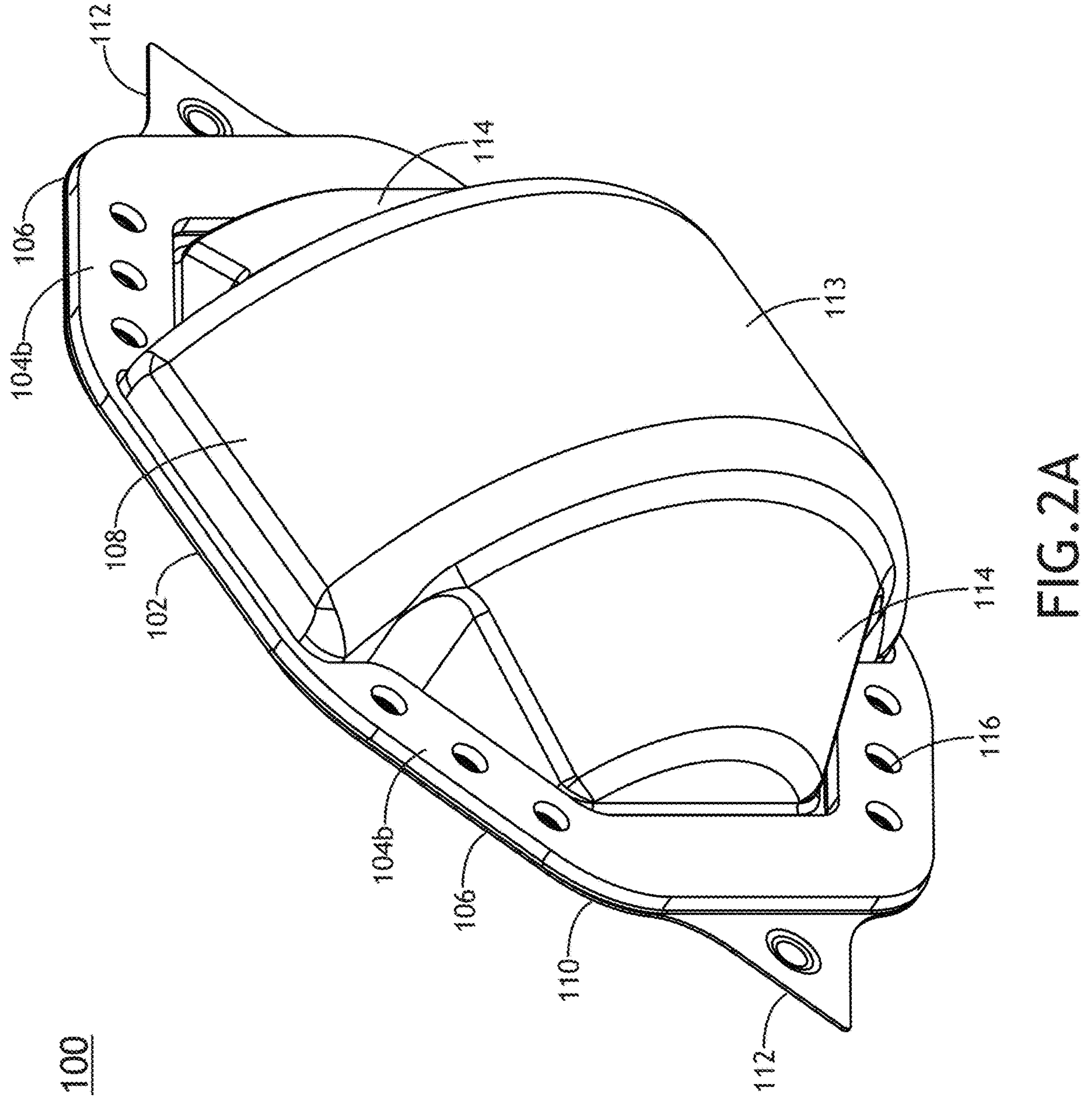
FIG. 2A illustrates a rear perspective view of the cover assembly with a support plate which is a support plate ring, in accordance with one or more embodiments of the present disclosure.
Figure 2B:
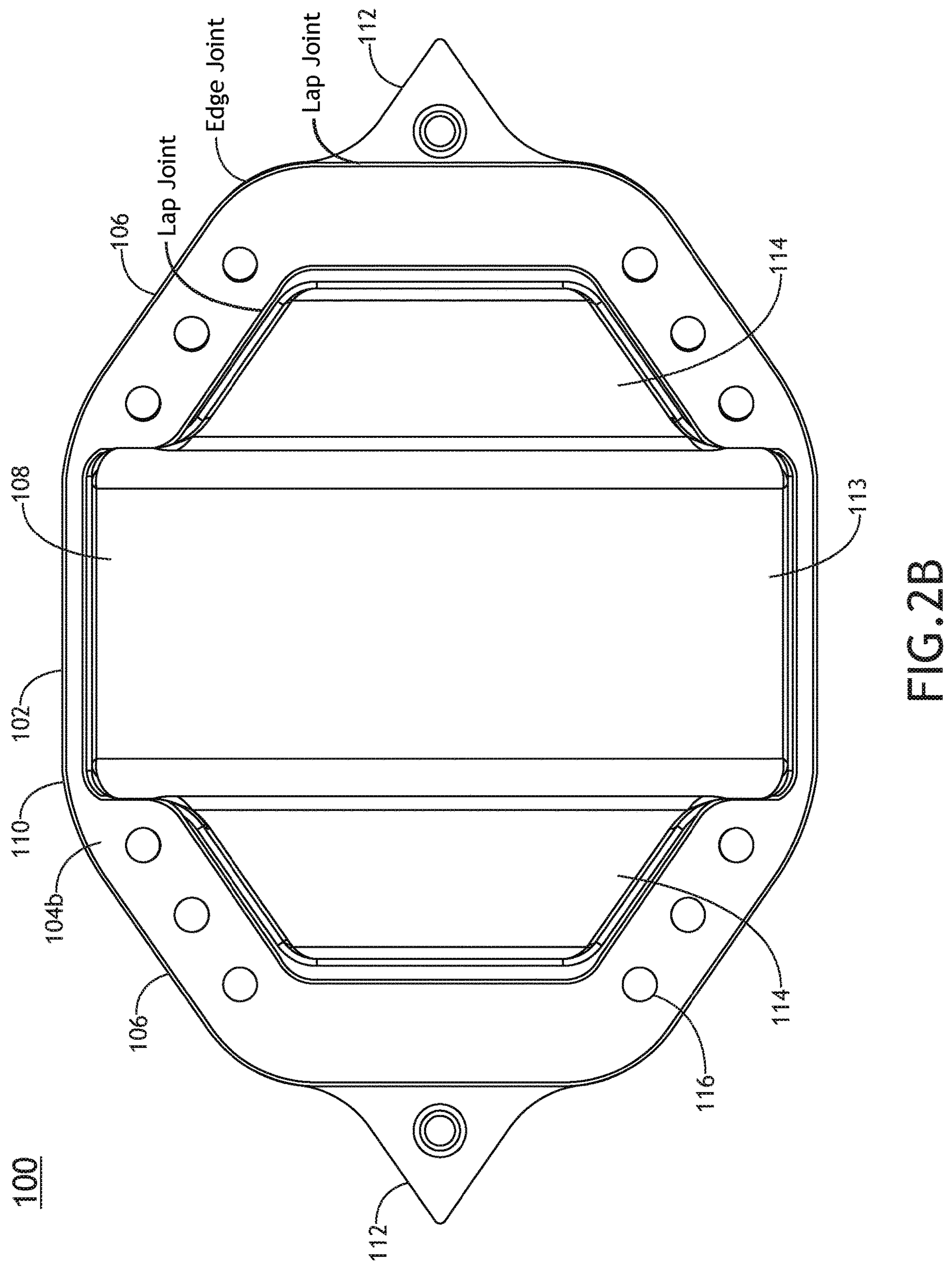
FIG. 2B illustrates a rear view of the cover assembly, in accordance with one or more embodiments of the present disclosure.

As illustrated in FIGS. 2A-2B, the support plate 104 may be a one-piece support plate which may be a support plate ring **104*b*. The support plate ring 104*b* may include an annular shape with sides having a C-shape which are connected on top and bottom. The support plate ring 104*b* may conform to the sides, the top, and the bottom of the tapered sections 114 and may conform to the sides, the top, and the bottom of the non-tapered section 113. In this regard, the support plate ring 104*b* may fully conform around the body portion 108**.

Figure 3A:
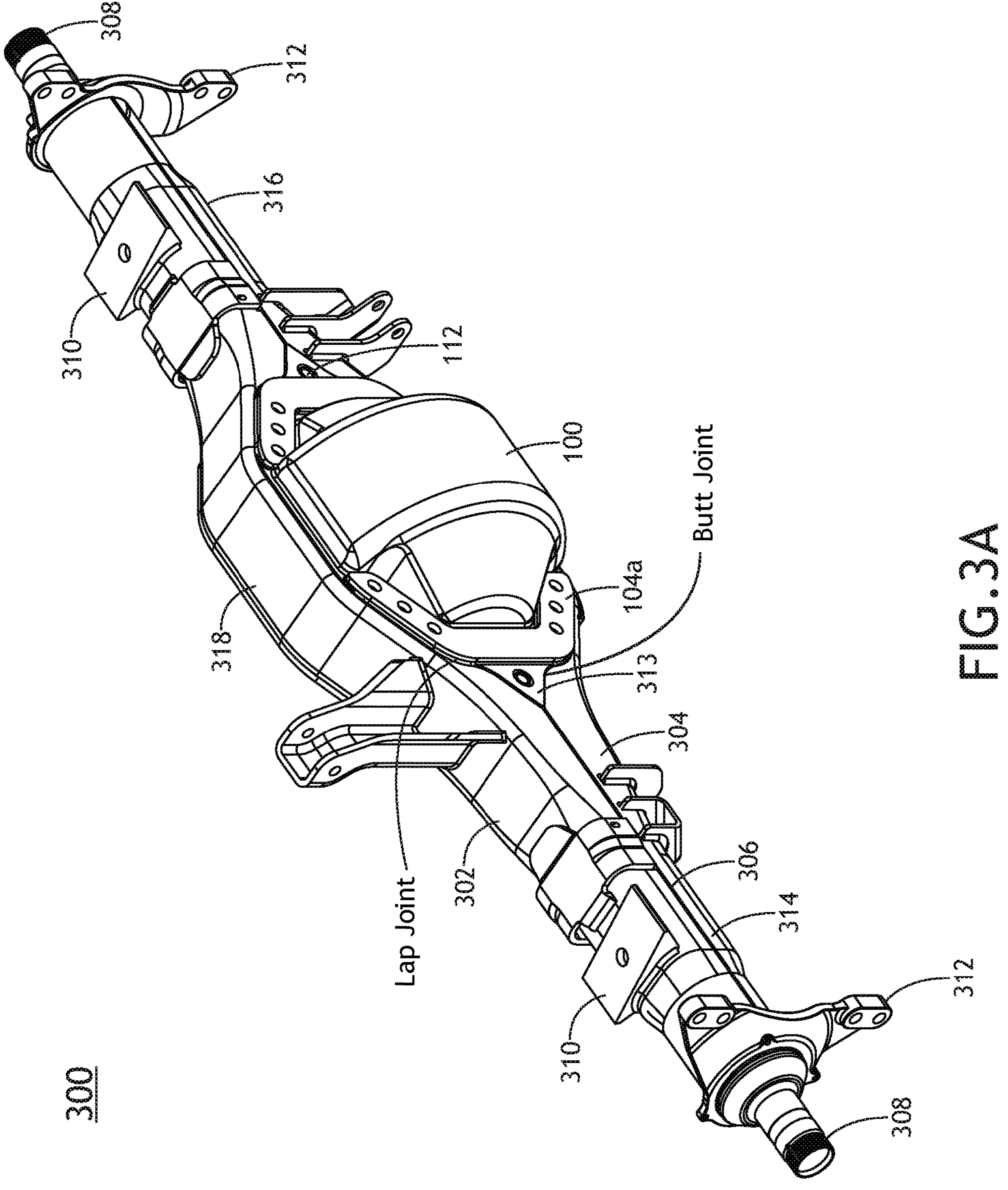
FIG. 3A illustrates a rear perspective view of a banjo axle case with the cover assembly, in accordance with one or more embodiments of the present disclosure.
Figure 3B:
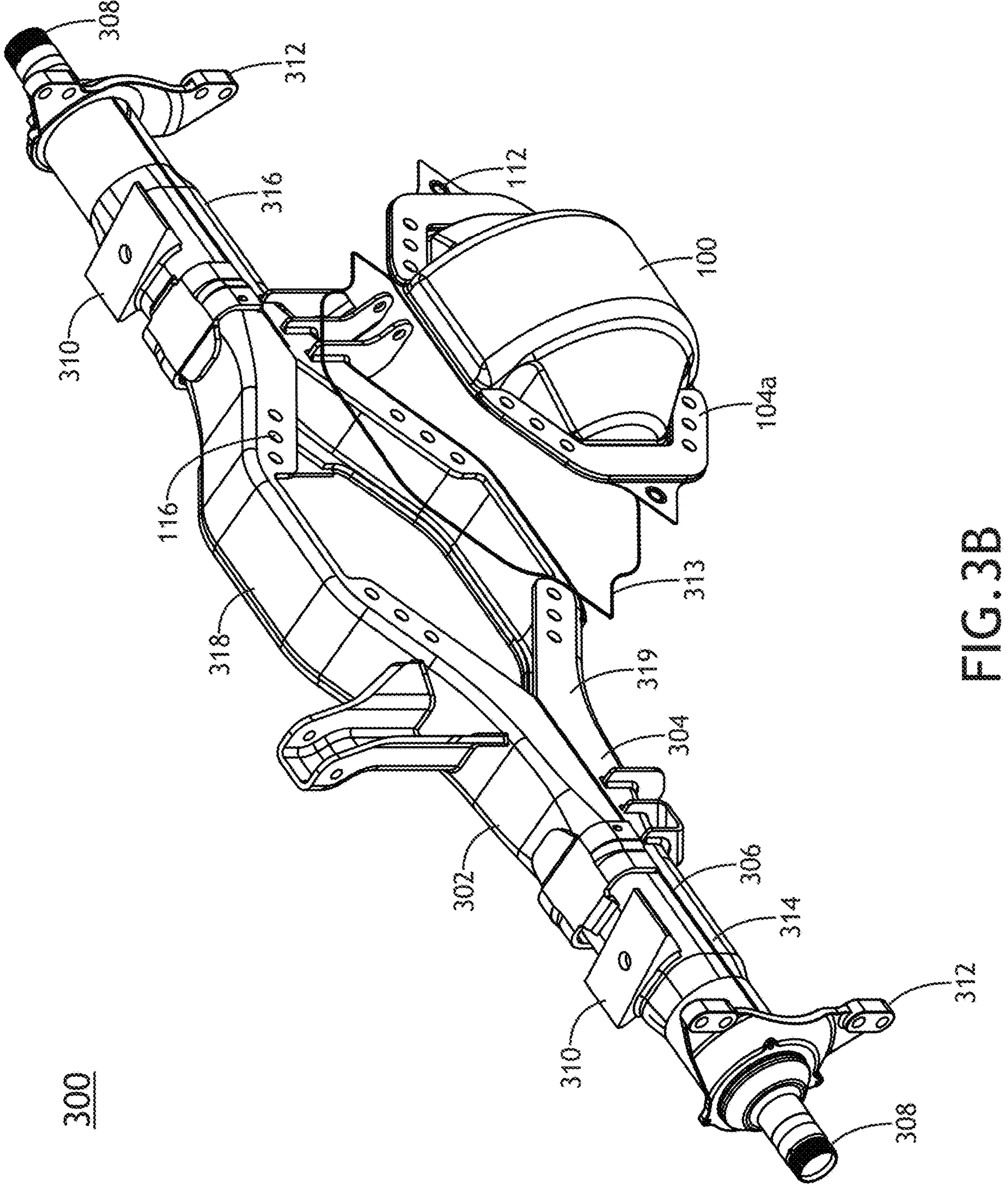
FIG. 3B illustrates a partial exploded view of the banjo axle case with the cover assembly and a weld joint exploded from the banjo axle case, in accordance with one or more embodiments of the present disclosure.
Figure 3C:
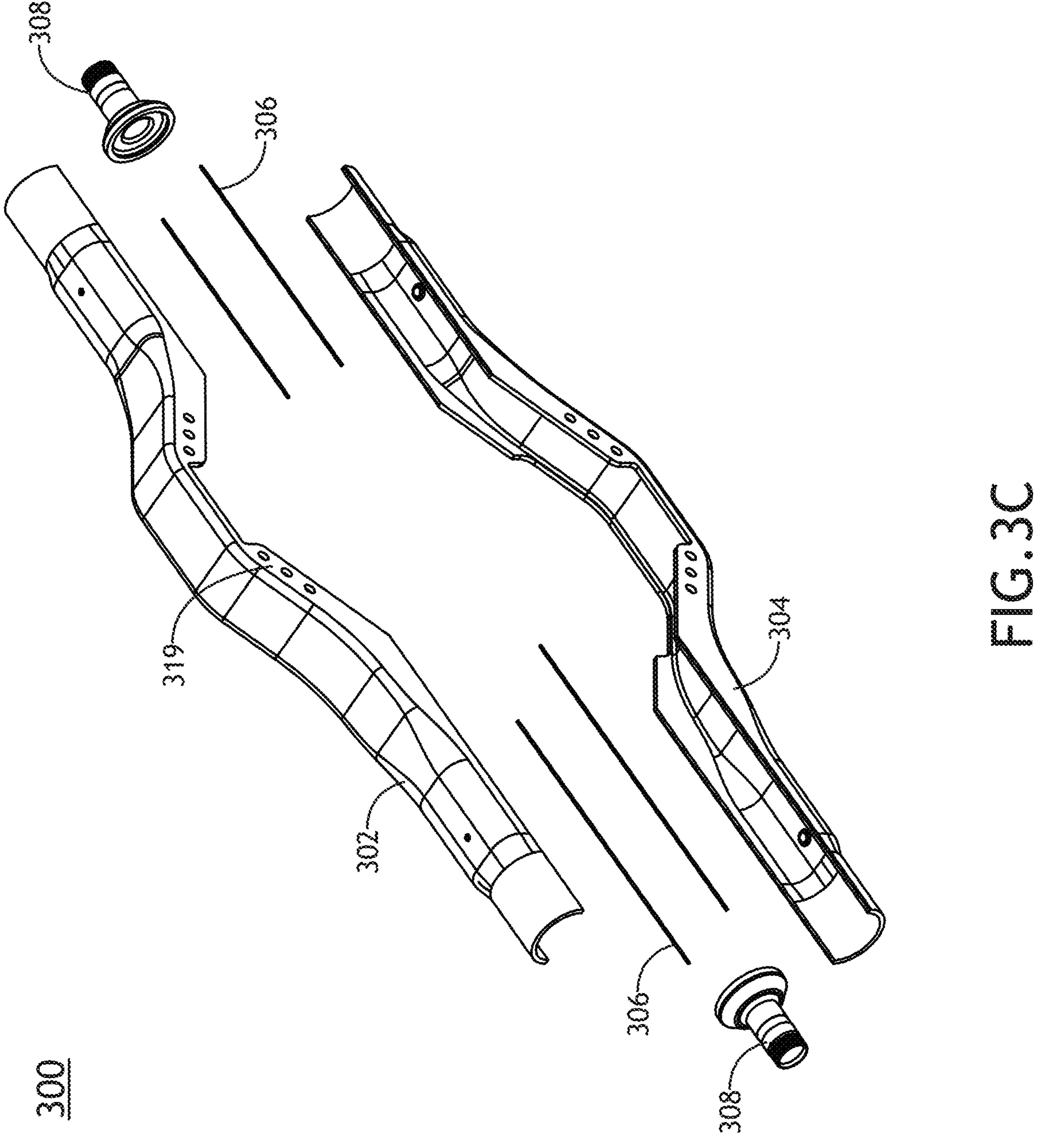
FIG. 3C illustrates a partial exploded view of the banjo axle case with an upper half member and a lower half member exploded, in accordance with one or more embodiments of the present disclosure.

FIGS. 3A-3C illustrate a banjo axle case 300, in accordance with one or more embodiments of the present disclosure. The banjo axle case 300 may also be referred to as a banjo-type axle housing. The banjo axle case 300 may include the cover assembly 100. The cover assembly 100 may be a rear cover of the banjo axle case 300. The banjo axle case 300 is illustrated with the cover assembly 100 including the support plate 104 which is segmented into the plate halves, although this is not intended to be limiting. The banjo axle case 300 may also include the cover assembly 100 including the support plate 104 which is the ring. The banjo axle case 300 may also include one or more additional components, such as, but not limited to, an upper half member 302, a lower half member 304, an upper-to-lower weld joint 306, axle sleeves 308, spring seats 310, brake mounting plates 312, and/or a cover-to-center weld joint 313.

The upper half member 302 and the lower half member 304 may be stamped metal. The upper half member 302 and the lower half member 304 may be a same material as the differential cover 102 and the support plate 104. The differential cover 102, the support plate 104, the upper half member 302, and the lower half member 304 may be manufactured from the same material, facilitating material efficiency, lowering assembly expenses, and bolstering overall strength. The upper half member 302 and the lower half member 304 may abut and be welded together. A bottom end and a top end of the upper half member 302 and the lower half member 304, respectively, may abut together. The upper half member 302 and the lower half member 304 may be welded together by the upper-to-lower weld joint 306. The upper-to-lower weld joint 306 may include any suitable type of weld joint, such as, but not limited to, a butt joint. The ends of the upper half member 302 and the lower half member 304 may abut together and be welded together by the butt joint.

The upper half member 302 and the lower half member 304 may jointly define a first tube portion 314, a second tube portion 316, and/or a central portion 318. The central portion 318 may also be referred to as a center or a differential holder. The central portion 318 may be disposed between the first tube portion 314 and the second tube portion 316.

The differential cover 102 and the central portion 318 may overlap, abut together, and be welded together. The central portion 318 may include a flange section 319. The flange portion 110 of the differential cover 102 and the flange section 319 of the central portion 318 may overlap. The flange section 319 may also define the through holes 116 together with the cover assembly 100. The through holes 116 defined by the support plate 104, the through holes 116 defined by the flange portion 110, and the through holes 116 defined by the flange section 319 may be aligned. The triangular portions 112 of the differential cover 102 may be disposed between and abut the upper half member 302 and the lower half member 304. For example, the triangular portions 112 may be disposed in a void space between the upper half member 302 and the lower half member 304, where the void space is formed based on the stamping process used to form the upper half member 302 and the lower half member 304. The triangular portions 112 may then abut the edges of the upper half member 302 and the lower half member 304. The differential cover 102 and the central portion 318 may be welded together by the cover-to-center weld joint 313.

The cover-to-center weld joint 313 may be formed between the differential cover 102 and the central portion 318 along an edge of the differential cover 102. For example, the cover-to-center weld joint 313 may be along a portion of and/or the entirety of the edge of the differential cover 102. The cover-to-center weld joint 313 may seal together the differential cover 102 and the central portion 318 by being formed along the entirety of the edge of the support plate 104. Sealing together the differential cover 102 and the central portion 318 may prevent fluid form ingress or egressing to and from the region disposed within the central portion 318. The differential cover 102 may provide an airtight seal for an interior volume of the central portion 318. The cover-to-center weld joint 313 may seal the flange portion 110 against the central portion 318.

The cover-to-center weld joint 313 may include any suitable type of weld joint, such as, but not limited to, a lap joint and/or a butt joint. For example, the lap joint may be between the edge of the flange portion 110 and a face of the flange section 319. By way of another example, the butt joint may be between an edge of the triangular portions 112 and an edge of the central portion 318. For instance, the butt joint may be between the edge of the triangular portions 112 and edges of the upper half member 302 and the lower half member 304.

The first tube portion 314 and a second tube portion 316 may extend outward from opposite sides of the central portion 318. The first tube portion 314 and a second tube portion 316 may also be referred to as a driver side tube and passenger side tube, respectively. The first tube portion 314 and a second tube portion 316 may include any suitable tube shape, such as, but not limited to, a rectangular tube (e.g., a rounded rectangular tube), a circular tube, or the like.

The spring seats 310 may be welded to the upper half member 302. The spring seats 310 may provide a seat for mounting a spring (e.g., a leaf spring) to the banjo axle case 300. The banjo axle case 300 may then bear a weight of a vehicle through the first tube portion 314 and the second tube portion 316. The first tube portion 314 and the second tube portion 316 may transmit the force through the central portion 318, causing a bending moment in the flange section 319 (e.g., around the through holes 116 defined by the flange section 319). Thus, the flange section 319 may be a high stress region. The support plate 104, via the differential cover 102, may increase the strength of the central portion 318, in particular the flange section 319. The support plate 104 and the flange portion 110 may distribute loads circumferentially around the central portion 318 and the cover assembly 100. The support plate 104 may ensure the banjo axle case 300 retains strength and stability under load. The support plate 104 may deliver the necessary reinforcement and durability to the banjo axle case 300 without relying on traditional thicknesses for the differential cover 102.

The axle sleeves 308 and the brake mounting plates 312 may each be affixed to an end of the first tube portion 314 and an end of the second tube portion 316. The axle sleeves 308 may be configured to receive axle shafts (not depicted). The axle shafts may be disposed within the first tube portion 314 and the second tube portion 316. The brake mounting plates 312 may also be referred to as caliper plates. The brake mounting plates 312 may be configured to mount a brake caliper.

Figure 4:
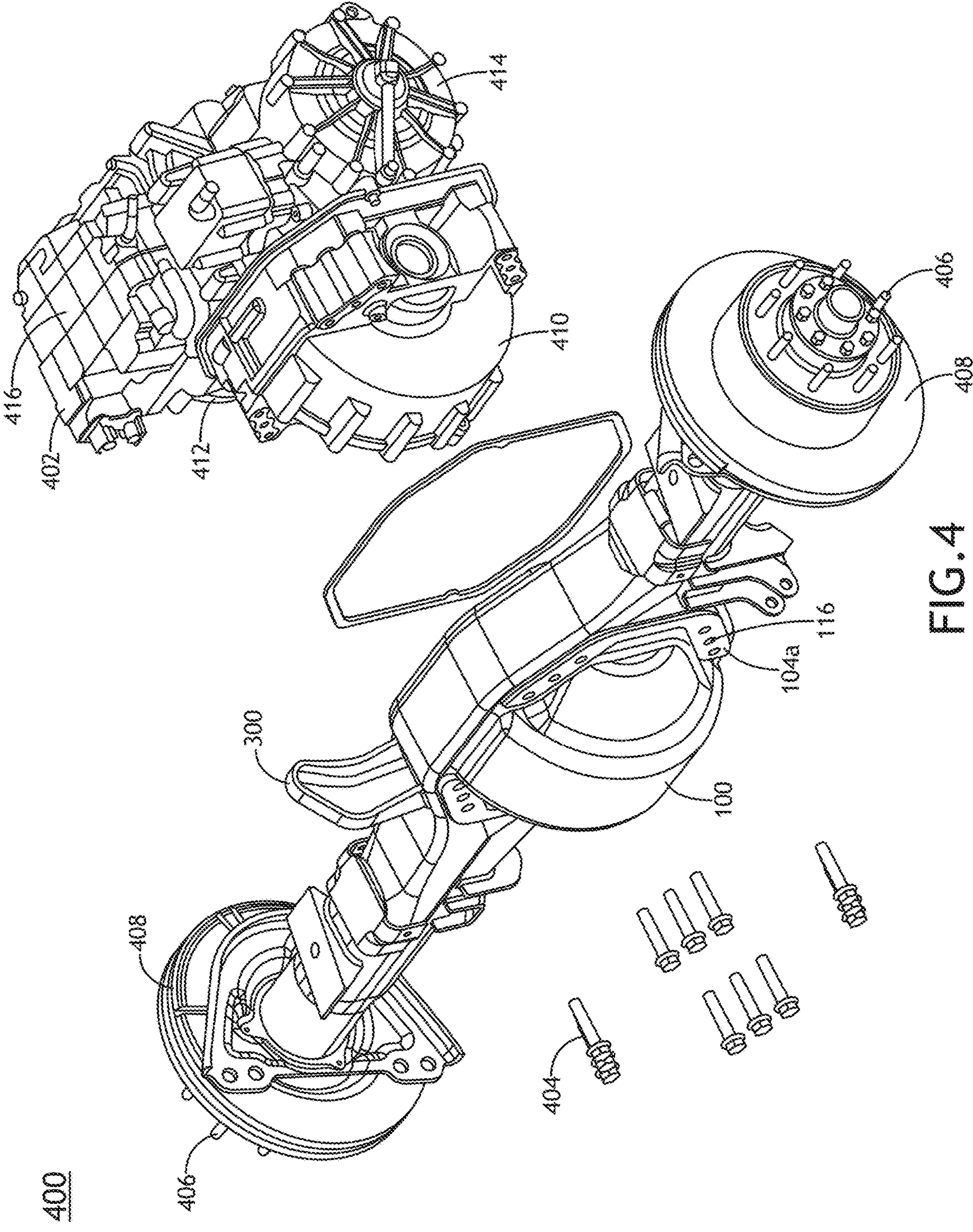
FIG. 4 illustrates an exploded view of an electric beam axle with an electric drive unit and fasteners exploded from the banjo axle case, in accordance with one or more embodiments of the present disclosure.

FIG. 4 illustrate an electric beam axle 400, in accordance, with one or more embodiments of the present disclosure. The electric beam axle 400 may also be referred to as a banjo-style beam e-axle or the like. The electric beam axle 400 may include the banjo axle case 300. The support plate 104 may address structural durability issues during maximum loading conditions of the banjo axle case 300 in the electric beam axle 400. The electric beam axle 400 may also include one or more components, such as, but not limited to, an electric drive unit 402, fasteners 404, wheel bearings 406, and/or rotors 408.

The electric drive unit 402 may include one or more components, such as, but not limited to, a differential 410, an electric motor 412, a transmission 414, and/or a power electronics unit 416.

The electric drive unit 402 may be configured to drive the differential 410 via the electric motor 412, the transmission 414, and/or the power electronics unit 416. The differential 410 may include any suitable differential, such as, but not limited to, an open differential, a locking differential, a limited-slip differential, or the like.

The differential 410 may be disposed within the central portion 318. The differential cover 102 may cover the differential 410. The shape of the body portion 108 may conform to a rear surface of the differential 410. The shapes of the non-tapered section 113 and/or the tapered sections 114 of the body portion 108 of the differential cover 102 may be selected to conform to the rear surface of the differential 410.

The electric drive unit 402 may be mounted to the banjo axle case 300 in a way that is modular and easy to service the electric drive unit 402. The electric drive unit 402 may be a fully sealed/contained drive unit supported by the banjo axle case 300. The electric drive unit 402 may be installed and removed from the banjo axle case 300 while the banjo axle case 300 is installed in the vehicle (e.g., for servicing the electric drive unit 402 without removing the banjo axle case 300 from the vehicle). The banjo axle case 300 and the differential 410 may be fastened together. For example, the differential 410 may be fastened to the cover assembly 100 and the central portion 318 of the banjo axle case 300. For instance, the differential 410 may be fastened to the support plate 104, the flange portion 110 of the differential cover 102, and the flange section 319. The fasteners 404 may be fasten between the through holes 116 and the differential 410 (e.g., by threaded bores formed in the differential 410). The fasteners 404 may affix the differential 410 to the banjo axle case 300. The through holes 116 and the fasteners 404 may also align the differential 410 within the central portion 318.

The wheel bearings 406 may also be referred to as a wheel hub. The wheel bearings 406 may be coupled to the axle sleeves 308, the axle shafts, and/or the rotors 408. The axle shafts may extend between and couple the differential 410 and the wheel bearings 406. The first tube portion 314 and the second tube portion 316 may house the axle shafts.

Referring generally again to the figures. Several advantages are achieved through employment of the embodiments disclosed herein including providing a durable and modular electric axle assembly, thereby improving serviceability. Embodiments provide a durable assembly comprised of thinner materials that offers weight and cost savings. Reducing the weight of the banjo axle case 300 may be beneficial to reduce an un-sprung weight of a vehicle Although much of the present disclosure is directed to the cover assembly 100 and the banjo axle case 300 being included in the electric beam axle 400, this is not intended as a limitation of the present disclosure. It is further contemplated that the benefits provided by the cover assembly 100 to the banjo axle case 300 may be used in any beam axle using the banjo axle case 300. It is further contemplated that the cover assembly 100 may be used with other types of axle cases.

Although the differential cover is described as including the triangular portions 112, this is not intended as a limitation of the present disclosure. It is contemplated that the banjo axle case 300 may include triangular inserts (not depicted) which may be disposed between and couple the upper half member 302, the lower half member 304, and the flange portion 110 of the differential cover 102 thereby replacing the functionality of the triangular portions 112. However, the triangular portions 112 may be beneficial to remove the need for the triangular inserts and decrease a total length of welding needed to form the banjo axle case 300.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, the term "axial" and derivatives thereof, such as "axially," shall be understood to refer to a direction along the axis. The term "coaxial" shall be understood to refer to a common axis. Further, the term "radial" and derivatives thereof, such as "radially," shall be understood in relation to the axis. For example, "radially outward" refers to further away from the axis, while "radially inward" refers to nearer to the axis. The term "circumference" or derivatives thereof, such as "circumferentially", may also be defined in reference to the center axis.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 cover assembly
102 differential cover
104 support plate
104*a* support plate halves
104*b* support plate ring
106 plate-to-cover weld joint
108 body portion
110 flange portion
112 triangular portions
113 non-tapered section
114 tapered sections
116 through holes
300 banjo axle case
302 upper half member
304 lower half member
308 axle sleeves
310 spring seats
312 brake mounting plates
313 cover-to-center weld joint
314 first tube portion
316 second tube portion
318 central portion
319 flange section
400 electric beam axle
402 electric drive unit
404 fasteners
406 wheel bearings
408 rotors
410 differential

412 electric motor
414 transmission
416 power electronics unit

What is claimed:

1. A cover assembly comprising:
a differential cover, the differential cover comprises a body portion and a flange portion, the body portion bulges outward from the flange portion, the flange portion is disposed around and extends from the body portion, the differential cover comprises a pair of triangular portions, the pair of triangular portions extend from opposing sides of the flange portion;
a support plate, the support plate and the flange portion are flat members, the support plate and the flange portion overlap, the support plate and the body portion do not overlap; and
a plate-to-cover weld joint, the differential cover and the support plate are welded together by the plate-to-cover weld joint.

2. The cover assembly of claim 1, wherein the support plate is thicker than the differential cover.

3. The cover assembly of claim 2, wherein the support plate is at least two times thicker than the differential cover.

4. The cover assembly of claim 1, wherein the differential cover and the support plate are stamped metal.

5. The cover assembly of claim 4, wherein the differential cover and the support plate are steel or an alloy thereof.

6. The cover assembly of claim 1, wherein the plate-to-cover weld joint is formed along an entirety of an edge of the support plate.

7. The cover assembly of claim 6, wherein the plate-to-cover weld joint includes an edge joint between an edge of the flange portion and the edge of the support plate.

8. The cover assembly of claim 6, wherein the plate-to-cover weld joint includes a lap joint between the edge of the support plate and a face defined between the flange portion and the pair of triangular portions.

9. The cover assembly of claim 6, wherein the body portion includes a non-tapered section and a pair of tapered sections, wherein the non-tapered section is disposed between the pair of tapered sections, wherein the pair of tapered sections taper outward from the flange portion to the non-tapered section.

10. The cover assembly of claim 9, wherein the flange portion extends from the non-tapered section and the pair of tapered sections, wherein the support plate conforms to at least the pair of tapered sections, wherein the plate-to-cover weld joint includes a lap joint between the edge of the support plate and a face defined between the flange portion and the pair of tapered sections.

11. The cover assembly of claim 1, wherein the support plate and the flange portion define a plurality of through holes, wherein the plurality of through holes defined by the support plate and the plurality of through holes defined by the flange portion are aligned.

12. The cover assembly of claim 1, wherein the support plate is segmented into support plate halves, wherein the support plate halves partially conform around the body portion.

13. The cover assembly of claim 12, wherein the support plate halves comprise a C-shape.

14. The cover assembly of claim 1, wherein the support plate is a support plate ring, wherein the support plate ring fully conforms around the body portion.

15. A banjo axle case comprising:
an upper half member;
a lower half member, wherein the upper half member and the lower half member define a first tube portion, a second tube portion, and a central portion, wherein the central portion is disposed between the first tube portion and the second tube portion;
an upper-to-lower weld joint, wherein the upper half member and the lower half member abut together and are welded together by the upper-to-lower weld joint;
a cover assembly comprising:
a differential cover, wherein the differential cover comprises a body portion and a flange portion, wherein the body portion bulges outward from the flange portion, wherein the flange portion is disposed around and extends from the body portion;
a support plate, wherein the support plate and the flange portion are flat members, wherein the support plate and the flange portion overlap, wherein the support plate and the body portion do not overlap; and
a plate-to-cover weld joint, wherein the differential cover and the support plate are welded together by the plate-to-cover weld joint; and
a cover-to-center weld joint, wherein the differential cover and the central portion are welded together by the cover-to-center weld joint.

16. The banjo axle case of claim 15, wherein the central portion includes a flange section, wherein the flange portion of the differential cover and the flange section of the central portion overlap, wherein the cover-to-center weld joint includes a lap joint between an edge of the flange portion and a face of the flange section.

17. The banjo axle case of claim 16, wherein the support plate, the flange portion, and the flange section define a plurality of through holes, wherein the plurality of through holes defined by the support plate, the plurality of through holes defined by the flange portion, and the plurality of through holes defined by the flange section are aligned.

18. The banjo axle case of claim 15, wherein the differential cover comprises a pair of triangular portions, wherein the pair of triangular portions extend from opposing sides of the flange portion, wherein the pair of triangular portions abut edges of the upper half member and the lower half member, wherein the cover-to-center weld joint includes a butt joint between edges of the pair of triangular portions and the edges of the upper half member and the lower half member.

19. An electric beam axle comprising:
a banjo axle casing comprising:
an upper half member;
a lower half member, wherein the upper half member and the lower half member define a first tube portion, a second tube portion, and a central portion, wherein the central portion is disposed between the first tube portion and the second tube portion;
an upper-to-lower weld joint, wherein the upper half member and the lower half member abut together and are welded together by the upper-to-lower weld joint;
a cover assembly comprising:
a differential cover, wherein the differential cover comprises a body portion and a flange portion, wherein the body portion bulges outward from the flange portion, wherein the flange portion is disposed around and extends from the body portion;
a support plate, wherein the support plate and the flange portion are flat members, wherein the support plate and the flange portion overlap, wherein the support plate and the body portion do not overlap; and a plate-to-cover weld joint, wherein the differential cover and the support plate are welded together by the plate-to-cover weld joint; and a cover-to-center weld joint, wherein the differential cover and the central portion are welded together by the cover-to-center weld joint; and an electric drive unit comprising a differential, an electric motor, and a transmission, wherein the differential is disposed within the central portion, wherein the banjo axle casing and the differential are fastened together by a plurality of fasteners.

20. The electric beam axle of claim 19, wherein the central portion includes a flange section, wherein the flange portion of the differential cover and the flange section of the central portion overlap, wherein the cover-to-center weld joint includes a lap joint between an edge of the flange portion and a face of the flange section, wherein the support plate, the flange portion, and the flange section define a plurality of through holes, wherein the plurality of through holes defined by the support plate, the plurality of through holes defined by the flange portion, and the plurality of through holes defined by the flange section are aligned, wherein the plurality of fasteners fasten between the plurality of through holes and the differential.

* * * * *